(12) United States Patent
Aleshin et al.

(10) Patent No.: US 11,830,630 B2
(45) Date of Patent: Nov. 28, 2023

(54) ENHANCED GRAPHITE NEUTRON REFLECTOR WITH BERYLLIUM OXIDE INCLUSIONS

(71) Applicant: Westinghouse Electric Company LLC, Cranberry Township, PA (US)

(72) Inventors: Yuriy Aleshin, Cayce, SC (US); Alex Levinsky, Pittsburgh, PA (US); Matthew R. Heisel, Pittsburgh, PA (US); Stuart T. Kellner, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/080,241

(22) Filed: Oct. 26, 2020

(65) Prior Publication Data
US 2022/0130561 A1 Apr. 28, 2022

(51) Int. Cl.
*G21C 11/06* (2006.01)
*G21C 3/18* (2006.01)
*G21C 7/28* (2006.01)

(52) U.S. Cl.
CPC ............. *G21C 11/06* (2013.01); *G21C 3/18* (2013.01); *G21C 7/28* (2013.01)

(58) Field of Classification Search
CPC . G21C 7/08; G21C 7/28; G21C 11/06; G21C 1/32–328; G21D 5/02
USPC ....... 376/220, 223, 458, 287, 351, 459, 904, 376/909
See application file for complete search history.

(56) References Cited

U.S. PATENT DOCUMENTS

| 2,992,982 | A | * | 7/1961 | Avery | G21C 7/08 |
| | | | | | 976/DIG. 134 |
| 3,081,247 | A | * | 3/1963 | Balent | G21C 1/00 |
| | | | | | 376/427 |
| 3,296,083 | A | | 1/1967 | Haake et al. | |
| 4,314,883 | A | * | 2/1982 | Fritz | G21C 11/06 |
| | | | | | 376/458 |
| 4,751,043 | A | * | 6/1988 | Freeman | G21C 11/06 |
| | | | | | 376/400 |
| 4,849,162 | A | * | 7/1989 | Garner | G21C 11/06 |
| | | | | | 376/400 |

(Continued)

FOREIGN PATENT DOCUMENTS

| EP | 3513409 A1 | 7/2019 |
| KR | 101704658 B1 | 2/2017 |

OTHER PUBLICATIONS

Joo, Hyung-Kook, Temitope A. Taiwo, and Won Sik Yang. "VHTR Numerical Benchmark Based on the Compact Nuclear Power Source Experiments." Proceedings of Joint International Topical Meeting on Mathematics & Computation and Supercomputing in Nuclear Applications. 2007. (Year: 2007).*

(Continued)

*Primary Examiner* — Jack W Keith
*Assistant Examiner* — Jinney Kil
(74) *Attorney, Agent, or Firm* — K&L Gates LLP

(57) ABSTRACT

A nuclear reactor is disclosed including a reactor core and a reflector assembly surrounding the reactor core. The reflector assembly includes a stationary reflector component including a graphite support structure comprising a plurality of channels defined therein and a plurality of beryllium-oxide pins positioned in the channels.

20 Claims, 2 Drawing Sheets

(56) References Cited

U.S. PATENT DOCUMENTS

| | | | |
|---|---|---|---|
| 2004/0062340 A1* | 4/2004 | Peterson | G21C 1/24 |
| | | | 376/383 |
| 2014/0177779 A1* | 6/2014 | Harkness | G21C 11/06 |
| | | | 376/458 |
| 2015/0243376 A1* | 8/2015 | Wilson | G21D 5/08 |
| | | | 376/347 |
| 2015/0357056 A1 | 12/2015 | Shayer | |
| 2017/0213610 A1* | 7/2017 | Sumita | G21C 7/02 |
| 2018/0019025 A1* | 1/2018 | Abbott | G21C 3/54 |
| 2018/0075931 A1* | 3/2018 | Arafat | G21C 9/02 |
| 2018/0226159 A1* | 8/2018 | Sterbentz | G21C 3/626 |
| 2021/0082587 A1* | 3/2021 | Inman | G21C 7/14 |
| 2021/0304909 A1* | 9/2021 | Gramlich | G21C 7/28 |

OTHER PUBLICATIONS

International Search Report and Written Opinion for International PCT Application No. PCT/US2021/072035, dated Feb. 9, 2022.

\* cited by examiner

ENHANCED GRAPHITE NEUTRON REFLECTOR WITH BERYLLIUM OXIDE INCLUSIONS

GOVERNMENT CONTRACT

This invention was made with government support under Contract DE-NE0008853 awarded by the Department of Energy. The government has certain rights in the invention.

BACKGROUND

This invention relates generally to nuclear reactors, such as small modular reactors (SMRs) and micro-reactors, and more particularly, to arrangements of reflectors surrounding the reactor core of the nuclear reactor.

The electricity energy market can be divided into centralized and decentralized markets. The centralized market is based on large (in the range of hundreds of MWe) power generators and high capacity dense transmission and distribution networks. The decentralized or off-grid market relies instead on compact power generators (<15 MWe) usually connected to small localized distribution networks or micro-grids. Currently, remote artic communities, remote mines, military bases and island communities are examples of decentralized markets. At present, the energy needs in off-grid markets are predominately satisfied by diesel generators. This leads to high costs of electricity, fossil fuel dependency, load restrictions, complicated fuel supply logistics, and aging infrastructure. The stringent requirements of off-grid markets include affordability, reliability, flexibility, resiliency, sustainability (clean energy), energy security, and rapid installation, and minimum maintenance efforts. All these demands can be addressed with nuclear energy.

Micro-reactors are nuclear reactors that are capable of generating less than 10 MWe and capable of being deployed for remote application. These micro-reactors can be packaged in relatively small containers, operate without active involvement of personnel, and operate without refueling/replacement for a longer period than conventional nuclear power plants.

One such micro-reactor is the eVinci™ Micro Reactor system, designed by Westinghouse Electric Company. These micro-reactors can be packaged in relatively small containers, operate without active involvement of personnel, and operate without refueling/replacement for a longer period than conventional nuclear power plants. Other examples of micro-reactors are described in commonly owned U.S. Provisional Application Publication No. 62/984,591, titled "HIGH TEMPERATURE HYDRIDE MODERATOR ENABLING COMPACT AND HIGHER POWER DENSITY CORES IN NUCLEAR MICRO-REACTORS", as well as in U.S. patent application Ser. No. 14/773,405, titled "MOBILE HEAT PIPE COOLED FAST REACTOR SYSTEM, which published as U.S. Patent Application Publication No. 2016/0027536, both of which are hereby incorporated by reference in their entireties herein.

In order to ensure compact size of the reactor, use of an effective neutron reflector is required. The reflector material and dimensions thereof impact the fuel amount, the micro-reactor core size, mass and the thermal power. The neutron reflector also contributes to neutron shielding. Thus, a selection of reflector design is a vital part of micro-reactor design development.

Existing manufacturing techniques of beryllium-based reflectors impose significant limits on the maximum size of the beryllium oxide components. Currently, hundreds of reflector pieces must be assembled and held in place with materials that do not have favorable neutronic properties, which, in addition to being labor intensive, negatively impacts the overall neutron reflector performance.

In addition to beryllium-based reflectors, graphite reflectors are known and widely used. However, graphite reflectors are neutronically less efficient than beryllium-based reflectors and are unable to meet micro-reactor requirements in size, mass and power output imposed for some applications.

In addition, when considering neutron reflector material and design selection, thermo-mechanical performance is another aspect that requires consideration. There is a significant temperature gradient in the radial reflector in the radial direction from the inner edge of the reflector, where the reactor core is located, to the outer edge of the reflector. Therefore, temperature induced stress has to be taken into account and minimized by design and material selection.

Various aspects of the present disclosure provide improved reflector designs to improve reactor efficiency.

SUMMARY

In various embodiments, a nuclear reactor is disclosed including a reactor core and a reflector assembly surrounding the reactor core. The reflector assembly includes a stationary reflector component including a graphite support structure comprising a plurality of channels defined therein and a plurality of beryllium-oxide pins positioned in the channels.

In various embodiments, a reflector assembly usable with a nuclear reactor is disclosed. The nuclear reactor includes a reactor core. The reflector assembly is configured to surround the reactor core. The reflector assembly includes a graphite support structure comprising a plurality of channels defined therein and a plurality of beryllium-oxide inclusions positioned in the channels.

In various embodiments, a nuclear reactor is disclosed including a reactor core and a reflector assembly surrounding the reactor core. The reflector assembly includes a stationary reflector portion and a movable reflector portion. The stationary reflector portion includes a graphite support structure comprising a plurality of channels defined therein and a plurality of beryllium-oxide inserts positioned in the channels. The movable reflector portion includes a plurality of control drums rotatable relative to the stationary reflector portion.

BRIEF DESCRIPTION OF THE DRAWINGS

Various features of the embodiments described herein, together with advantages thereof, may be understood in accordance with the following description taken in conjunction with the accompanying drawings as follows.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 1:
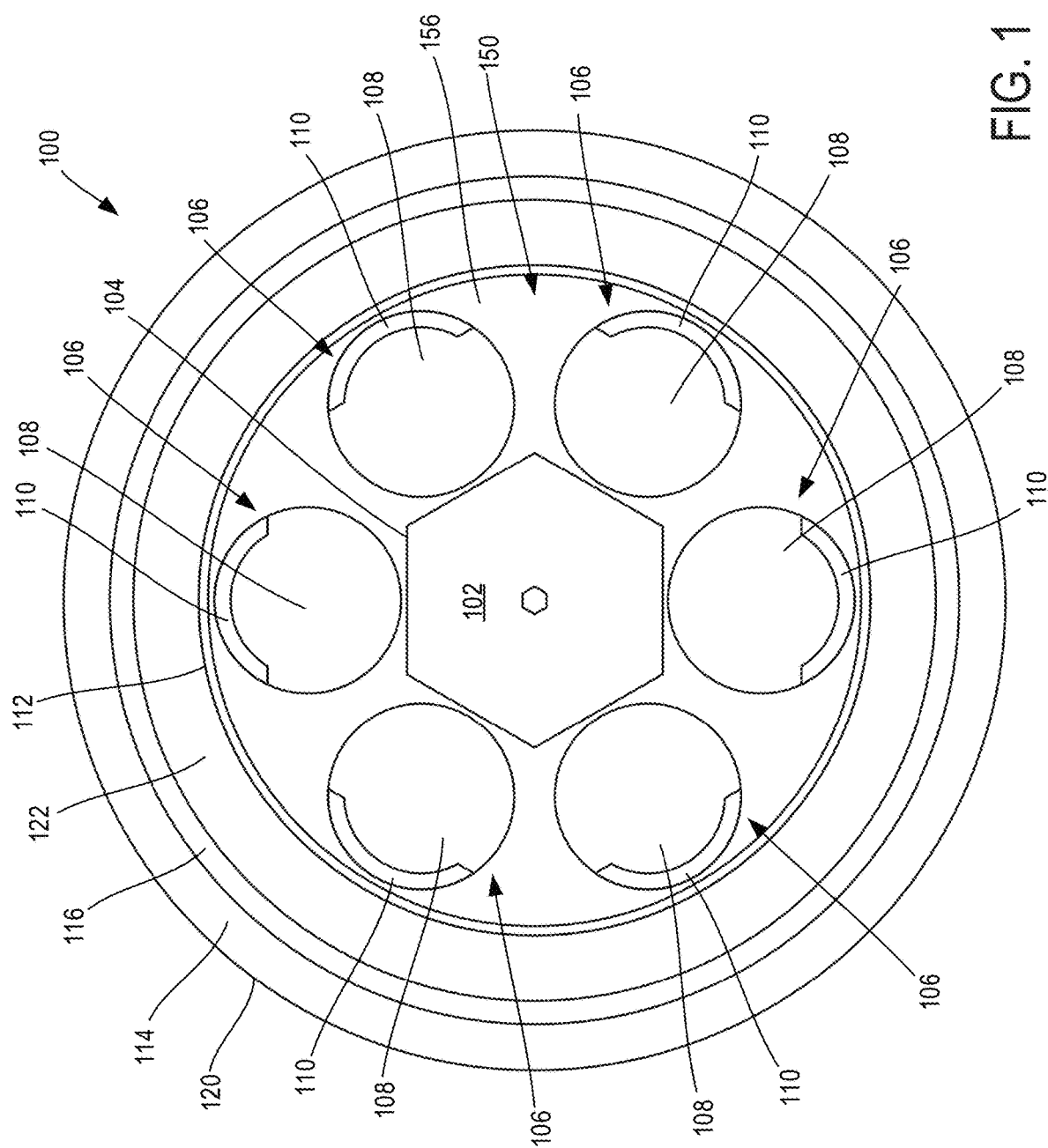
FIG. 1 illustrates micro-reactor with an enhanced neutron reflector assembly, according to at least one aspect of the present disclosure.
Figure 2:
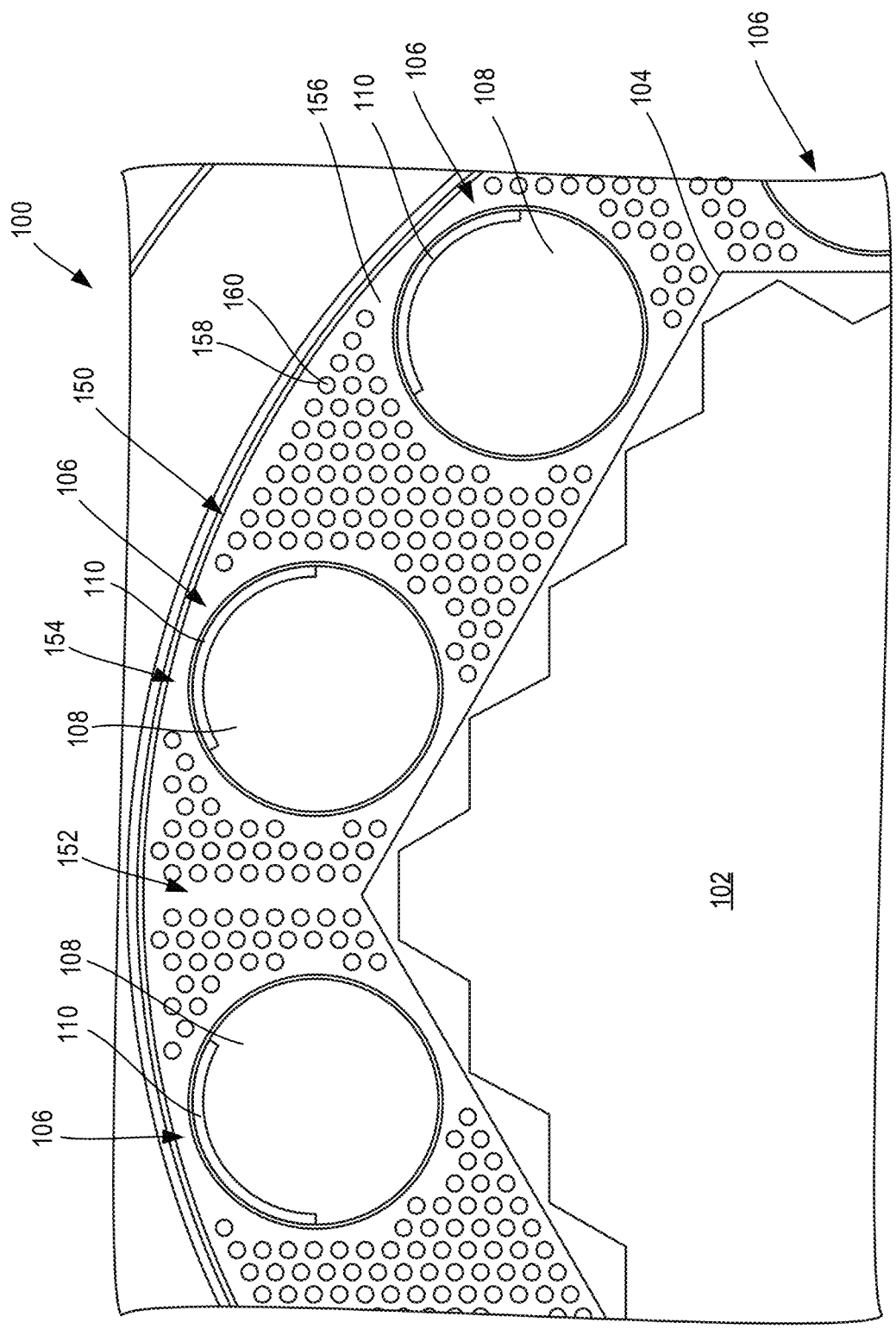
FIG. 2 illustrates a zoomed in perspective of the micro-reactor of FIG. 1, according to at least one aspect of the present disclosure Corresponding reference characters indicate corresponding parts throughout the several views. The exemplifications set out herein illustrate various embodiments of the invention, in one form, and such exemplifications are not to be construed as limiting the scope of the invention in any manner.

Referring now to FIGS. 1 and 2, a micro-reactor 100 is provided, according to at least one aspect of the present disclosure. The micro-reactor 100 can include a reactor core 102 that can house fuel, moderator channels, heat pipes and reactivity control channels (shutdown rods). In various embodiments, the reactor core 102 can be similar to reactor cores described in U.S. Provisional Application Publication No. 62/984,591 and in U.S. patent application Ser. No. 14/773,405, which were both incorporated by reference above. In various embodiments, the reactor core 102 can include a reactor core housing, or shell 104, that can house the fuel, the plurality of heat pipes, the plurality of moderator channels and the plurality of reactivity control channels in the reactor core 102. The fuel can be encapsulated in the core 102 while the heat pipes, moderator channels and reactivity control channels can extend outside of the core 102 to a secondary side of the micro-reactor 100 so as to allow for extraction of heat generated by the fuel.

In various embodiments, the micro-reactor 100 can include an enhanced neutron reflector assembly 150 surrounding the reactor core 102. Referring particularly to FIG. 2, the reflector assembly 150 can include both a stationary reflector component 152 and a movable reflector component 154.

In one aspect, continuing to refer to FIG. 2, the stationary reflector component 152 can include a graphite support structure 156 that can include a plurality of channels 158 defined therein. In various embodiments, the graphite support structure 156 can be of unitary construction. In various other embodiments, the graphite support structure 156 can be assembled from a plurality of smaller, graphite support structure components pieced together to form the graphite support structure 156. Having the graphite support structure 156 being formed from a plurality of smaller, graphite support components can assist in the manufacturing process and can be used to provide the spacing for other components within the stationary reflector component 152, such as the movable reflector component 154, as will be described in more detail below. In various embodiments, the graphite support structure 156 can be formed from a plurality of smaller, graphite support components such that the individual components are positioned to provide continuous neutronic reflection. In one example embodiment, the plurality of smaller, graphite support components can be positioned in both the radial and the axial direction relative to the reactor core 102 so as to provide continuous neutronic reflection. In addition, assembling the graphite support structure 156 from a plurality of smaller graphite support structure components allows for overlapping gaps to be left between the individual components. These gaps between the smaller graphite support components can be selected to provide a continuous neutronic reflection in case of differential thermal expansion between core 102 and reflector assembly 150, as well as support mechanical load transfer and heat removal. In various embodiments, graphite support structure 156 can include a radial thickness in the range of about 0.3 meters to about 1.0 meters. Other embodiments are envisioned where the radial thickness of the graphite support structure 156 can be greater than 1.0 meters or less than 0.3 meters.

In one aspect, the reflector assembly 150 can further include a plurality of beryllium oxide inclusions, pins or inserts 160, that can be removably positioned in the channels 158 defined by the graphite support structure 156. In one aspect, any type of beryllium-based or beryllium-oxide inclusion can be used. In various embodiments, the graphite support structure 156 can act a support structure for supporting the beryllium oxide inclusions 160, such as in the channels 158, while also supporting neutronic reflection from the reactor core 102 and providing for mechanical and thermal load transfer.

As referenced above, the micro-reactor 100 can further include a movable reflector component 154. In various embodiments, the movable reflector component 154 can comprise a plurality of control drums 106 that can be rotatably positioned within the stationary reflector component 152. In one aspect, the control drums 106 can include a neutron absorber section 110 and a neutron reflector section 108. In various embodiments, the control drums 106 can each be rotatable relative to the stationary reflector component 152 between a neutron reflecting position and a neutron absorbing position. In the neutron reflecting position, the neutron reflector sections 108 of the control drums 106 can face the reactor core 102, thus increasing reactivity of the reactor core 102. In the neutron absorbing position, the neutron absorber sections 110 can face the reactor core 102, limiting or stopping reactivity within the reactor core 102. In various embodiments, the neutron reflector sections 108 can comprise beryllium-oxide. In one example embodiment, the neutron reflector sections 108 can be manufactured out of graphite and include channels defined therein, similar to the graphite support structure 156. In such an embodiment, beryllium-oxide includes can be positioned in the channels defined in the graphite control drums. In various other embodiments, the neutron reflector sections 108 of the controls drums 106 can be manufactured substantially, if not entirely, out of beryllium-oxide.

In one aspect, the control drums 106 can be the only movable component within the reactor core 102. In one embodiment, all of the control drums 106 can rotate together such that all of control drums 106 are either in the neutron reflecting position or the neutron absorbing position. In other embodiments, the control drums 106 can be independently rotatable relative to each other. In other embodiments, the control drums 106 can be rotated to a partially rotated position where a portion of both the neutron absorber section 110 and neutron reflector section 108 are at least partially facing the reactor core, thus allowing for an intermediate level of reactivity within the reactor core 102. In another embodiment, the control drums 106 can automatically rotate between the neutron reflecting position and the neutron absorbing position depending on various factors, such as the temperature within the reactor core 102. In one aspect, when the temperature within the reactor core 102 meets or exceeds a threshold temperature, the control drums 106 can be automatically rotate to the neutron absorbing position. In another aspect, when the temperature within the reactor core 102 drops below a threshold temperature, the control drums 106 can automatically rotate to the neutron reflecting position. Various other embodiments are envisioned where the control drums 106 can rotate between the neutron absorbing position and the neutron reflecting position based on other measured parameters within the reactor. As one example, the control drums 106 can be rotatable between the neutron absorbing position and the neutron reflecting position based on measured neutron flex within the micro-reactor 100.

In various embodiments, the reactor core 102 and the enhanced neutron reflector assembly 150 can be housed within a structural container 112, a neutron absorber vessel 122, and a boron carbide, or gamma, neutron shield 114. In addition, an air gap 116 can be provided between the neutron absorber vessel 122 and the boron carbide shield 114 for shield cooling and gamma shielding. All these components can be placed inside of an outer structural canister 120. In various other embodiments, the reactor core 102 and the enhanced neutron reflector assembly 150 could also be housed in the housings described in U.S. Provisional Application Publication No. 62/984,591, as well as in U.S. patent application Ser. No. 14/773,405, which have been incorporated by reference in their entireties above. In various embodiments, the reactor core housing 104 can also comprise beryllium-oxide.

In one aspect, the channels 158 defined in the graphite support structure 156 can be sized and positioned such that a good neutron performance of the reflector assembly 150 can be achieved with the beryllium oxide inclusions 160. In various embodiments, selection of the channels 158 diameter, pitch, and spacing relative to adjacent channels 158 can be varied to optimize performance of the reflector assembly 150. In one example embodiment, the channels 158 can be placed in triangle or rectangle pitch as uniformly as practically possible taking into account provisions for the movable reflector component 154 and split stationary reflector parts, as well as a thermal assessment of the reactor core. In various embodiments, the pitch of the channels 158 can be in the range of about 0.013 meters to about 0.07 meters. In various embodiments, the diameter of the channels 158, and thus, the diameter of the beryllium-oxide inclusions 160, can be in the range of about 0.005 meters to about 0.05 meters. In other embodiments, the diameter of the beryllium oxide inclusions 160 and diameter of the channels 158 can be different. In various embodiments, channels 158 defined in the graphite support structure 156 can be spaced apart from adjacent channels 158 in the range of 0.001 meters to about 0.06 meters apart. In one aspect, the spacing of the channels 158 can be defined as the space between an outer edge of one channel 158 relative to an outer edge of an adjacent channel 158. In various embodiments, the above discussed parameters (diameter, pitch and channel spacing) in the graphite support structure 156 can vary from channel to channel.

While the neutron reflection efficiency of above-described concept is inferior to a strictly beryllium-oxide reflector performance, the difference is not substantially significant, nor does it affect the required micro-reactor power output. The above-described concept, however, does improve thermo-mechanical performance of the reflector, as well as provides simplified manufacturing and assembly processes. Moreover, an overall small reflector mass reduction is expected for this concept by taking into account the density difference between graphite and beryllium-oxide. The above-described reflector concept will also result in a cost reduction as a result of the simplified beryllium-oxide shape, as well as a potential reduction of the number of beryllium oxide components. The advantages of this concept include, but are not limited to, an ability to maintain relatively small dimensions of the neutron reflector itself, an ability to maintain a relatively small amount of fuel for providing the required thermal power, an improved manufacturability and assembling of the reflector, and improved thermo-mechanical performance, and a reduced reflector cost. Hence, the combination of materials (graphite and beryllium oxide) allow for good neutron reflection, an acceptable thermo-mechanical performance and a feasibility of manufacturing and assembling that would be very beneficial.

Various aspects of the subject matter described herein are set out in the following examples.

Example 1—A nuclear reactor comprising a reactor core and a reflector assembly surrounding the reactor core, wherein the reflector assembly comprises a stationary reflector component comprising a graphite support structure comprising a plurality of channels defined therein and a plurality of beryllium-oxide pins positioned in the channels.

Example 2—The nuclear reactor of Example 1, wherein the reflector assembly further comprises a movable reflector component, wherein the movable reflector component comprises a plurality of control drums rotatable relative to the stationary reflector component.

Example 3—The nuclear reactor of Example 2, wherein each of the control drums comprises a reflector portion and an absorber portion, wherein the reflector portion comprises beryllium-oxide.

Example 4—The nuclear reactor of any one of Examples 1-3, further comprising a reactor core housing, wherein the reactor core is positioned within the reactor core housing, and wherein the reactor core housing comprises beryllium-oxide.

Example 5—The nuclear reactor of any one of Examples 1-4, wherein the graphite support structure comprises a radial thickness of about 0.3 meters to about 1.0 meters.

Example 6—The nuclear reactor of any one of Examples 1-5, wherein each of the plurality of channels comprises a diameter, and wherein the diameter is about 0.005 meters to about 0.05 meters.

Example 7—The nuclear reactor of any one of Examples 1-6, wherein each of the plurality of channels comprises a pitch, and wherein the pitch is about 0.013 meters to about 0.07 meters.

Example 8—The nuclear reactor of any one of Examples 1-7, wherein each of the plurality of channels are spaced apart from each other by about 0.001 meters to about 0.06 meters.

Example 9—The nuclear reactor of any one of Examples 1-8, wherein the graphite support structure is an assembly comprised of a plurality of graphite support structures positioned to provide continuous neutronic reflection.

Example 10—A reflector assembly usable with a nuclear reactor comprising a reactor core, wherein the reflector assembly is configured to surround the reactor core, and wherein the reflector assembly comprises a graphite support structure comprising a plurality of channels defined therein and a plurality of beryllium-oxide inclusions positioned in the channels.

Example 11—The reflector assembly of Example 10, further comprising a plurality of control drums rotatable relative to the graphite support structure.

Example 12—The reflector assembly of Example 11, wherein each of the control drums comprises a reflector portion and an absorber portion, and wherein the reflector portion comprises beryllium-oxide.

Example 13—The reflector assembly of any one of Examples 10-12, wherein the graphite support structure comprises a radial thickness of about 0.3 meters to about 1.0 meters.

Example 14—The reflector assembly of any one of Examples 10-13, wherein each of the plurality of channels comprises a diameter, and wherein the diameter is about 0.005 meters to about 0.05 meters.

Example 15—The reflector assembly of any one of Examples 10-14, wherein each of the plurality of channels comprises a pitch, and wherein the pitch is about 0.013 meters to about 0.07 meters.

Example 16—The reflector assembly of any one of Examples 10-15, wherein each of the plurality of channels are spaced apart from each other by about 0.001 meters to about 0.06 meters.

Example 17—The reflector assembly of any one of Examples 10-16, wherein the graphite support structure is an assembly comprised of a plurality of graphite support structures positioned to provide continuous neutronic reflection.

Example 18—A nuclear reactor comprising a reactor core and a reflector assembly surrounding the reactor core, wherein the reflector assembly comprises a stationary reflector portion and a movable reflector portion. The stationary reflector portion comprises a graphite support structure comprising a plurality of channels defined therein and a plurality of beryllium-oxide inserts positioned in the channels. The movable reflector portion comprises a plurality of control drums rotatable relative to the stationary reflector portion.

Example 19—The nuclear reactor of Example 18, wherein each of the control drums comprises a reflector portion and an absorber portion, and wherein the reflector portion comprises beryllium-oxide.

Example 20—The nuclear reactor of Examples 18 or 19, further comprising a reactor core housing, wherein the reactor core is positioned within the reactor core housing, and wherein the reactor core housing comprises beryllium-oxide.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A nuclear reactor, comprising:
   a reactor core; and
   a reflector assembly surrounding the reactor core, wherein the reflector assembly comprises:
      a stationary reflector component stationary during operation of the nuclear reactor, wherein the stationary reflector component comprises:
         a graphite support structure defining a plurality of channels; and
         a beryllium-oxide pin positioned in each of the channels, wherein each beryllium-oxide pin is supported by and removable from the respective channel; and
      a movable reflector component movable during operation of the nuclear reactor, wherein the movable reflector component comprises a plurality of control drums rotatable relative to the stationary reflector component.

2. The nuclear reactor of claim 1, wherein each of the control drums comprises a reflector portion and an absorber portion, and wherein the reflector portion comprises beryllium-oxide.

3. The nuclear reactor of claim 1, further comprising a reactor core housing, wherein the reactor core is positioned within the reactor core housing, and wherein the reactor core housing comprises beryllium-oxide.

4. The nuclear reactor of claim 1, wherein the graphite support structure comprises a radial thickness of about 0.3 meters to about 1.0 meters.

5. The nuclear reactor of claim 1, wherein each of the plurality of channels defines a circular shape comprising a diameter, and wherein the diameter is about 0.005 meters to about 0.05 meters.

6. The nuclear reactor of claim 1, wherein each of the plurality of channels comprises a pitch, and wherein the pitch is about 0.013 meters to about 0.07 meters.

7. The nuclear reactor of claim 1, wherein each of the plurality of channels are spaced apart from each other by about 0.001 meters to about 0.06 meters.

8. The nuclear reactor of claim 1, wherein the graphite support structure is an assembly comprised of a plurality of graphite support structures positioned to provide continuous neutronic reflection.

9. A reflector assembly usable with a nuclear reactor comprising a reactor core, wherein the reflector assembly is configured to surround the reactor core, and wherein the reflector assembly comprises:
   a stationary reflector portion stationary during operation of the nuclear reactor, wherein the stationary reflector portion comprises:
      a graphite support structure defining a plurality of channels; and
      a beryllium-oxide inclusion positioned in each of the channels, wherein each beryllium-oxide inclusion is supported by and removable from the respective channel; and
   a movable reflector portion movable during operation of the nuclear reactor, wherein the movable reflector portion comprises a plurality of control drums rotatable relative to the graphite support structure.

10. The reflector assembly of claim 9, wherein each of the control drums comprises a reflector portion and an absorber portion, and wherein the reflector portion comprises beryllium-oxide.

11. The reflector assembly of claim 9, wherein the graphite support structure comprises a radial thickness of about 0.3 meters to about 1.0 meters.

12. The reflector assembly of claim 9, wherein each of the plurality of channels defines a circular shape comprising a diameter, and wherein the diameter is about 0.005 meters to about 0.05 meters.

13. The reflector assembly of claim 9, wherein each of the plurality of channels comprises a pitch, and wherein the pitch is about 0.013 meters to about 0.07 meters.

14. The reflector assembly of claim 9, wherein each of the plurality of channels are spaced apart from each other by about 0.001 meters to about 0.06 meters.

15. The reflector assembly of claim 9, wherein the graphite support structure is an assembly comprised of a plurality of graphite support structures positioned to provide continuous neutronic reflection.

16. A reflector assembly usable with a nuclear reactor comprising a reactor core, wherein the reflector assembly is configured to surround the reactor core, and wherein the reflector assembly comprises:
   a graphite support structure defining a channel;
   a beryllium-oxide pin positioned in the channel, wherein the beryllium-oxide pin is supported by and removable from the channel, and wherein the beryllium-oxide pin is stationary during operation of the nuclear reactor; and
   a control drum rotatable relative to the graphite support structure and the beryllium-oxide pin during operation of the nuclear reactor.

17. The reflector assembly of claim 16, wherein the control drum comprises a reflector portion and an absorber portion, and wherein the reflector portion comprises beryllium-oxide.

18. The reflector assembly of claim 16, wherein the channel defines a circular shape comprising a diameter, and wherein the diameter is about 0.005 meters to about 0.05 meters.

19. The reflector assembly of claim 16, wherein the channel comprises a pitch, and wherein the pitch is about 0.013 meters to about 0.07 meters.

20. The reflector assembly of claim 16, wherein the graphite support structure is an assembly comprised of a plurality of graphite support structures positioned to provide continuous neutronic reflection.

* * * * *